(12) United States Patent
Matsui et al.

(10) Patent No.: US 12,141,735 B2
(45) Date of Patent: Nov. 12, 2024

(54) MANAGEMENT APPARATUS, MANAGEMENT SYSTEM, MANAGEMENT METHOD AND MANAGEMENT PROGRAM

(71) Applicant: DAIKIN INDUSTRIES, LTD., Osaka (JP)

(72) Inventors: Hidenori Matsui, Osaka (JP); Kiichiro Sato, Osaka (JP); Toshiaki Mukaidani, Osaka (JP); Junko Yamauchi, Osaka (JP); Hiroko Inoue, Osaka (JP); Chiharu Katada, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/551,991

(22) PCT Filed: Mar. 25, 2022

(86) PCT No.: PCT/JP2022/014714
§ 371 (c)(1),
(2) Date: Sep. 22, 2023

(87) PCT Pub. No.: WO2022/210436
PCT Pub. Date: Oct. 6, 2022

(65) Prior Publication Data
US 2024/0177101 A1 May 30, 2024

(30) Foreign Application Priority Data
Mar. 31, 2021 (JP) .................. 2021-059429

(51) Int. Cl.
*G06Q 10/083* (2024.01)
*B65G 1/137* (2006.01)

(52) U.S. Cl.
CPC ......... *G06Q 10/083* (2013.01); *B65G 1/1375* (2013.01)

(58) Field of Classification Search
CPC .................................................... G06Q 10/083
(Continued)

(56) References Cited

U.S. PATENT DOCUMENTS

2020/0310438 A1   10/2020   Suzuki et al.
2021/0125146 A1*   4/2021   Tazume ................. G06Q 10/08

FOREIGN PATENT DOCUMENTS

JP    2001-151315    6/2001
JP    2002-255349    9/2002
(Continued)

OTHER PUBLICATIONS

"Automated Package Delivery Accepting System -Smart Freight Box" Published by IEEE (Year: 2019).*
(Continued)

*Primary Examiner* — Zeina Elchanti
(74) *Attorney, Agent, or Firm* — IPUSA, PLLC

(57) ABSTRACT

A management apparatus for managing a status of a plurality of storage cabinets whose use can be changed, includes a managing unit configured to collect storage cabinet information including the use of the plurality of storage cabinets and information relating to a usage status of the plurality of storage cabinets, and store the storage cabinet information in a storage unit; an acquiring unit configured to acquire information relating to a package to be stored; a storage cabinet managing unit configured to change the use of the storage cabinet; and an output unit configured to output information indicating a vacancy status of the storage cabinet corresponding to the use of the package, based on the information relating to the package and the storage cabinet information.

13 Claims, 18 Drawing Sheets

(58) Field of Classification Search
USPC .................................................. 705/330, 339
See application file for complete search history.

(56) References Cited

FOREIGN PATENT DOCUMENTS

| | | |
|---|---|---|
| JP | 2017-078967 | 4/2017 |
| JP | 2017-165510 | 9/2017 |
| JP | 2018-067310 | 4/2018 |
| JP | 2019-101857 | 6/2019 |
| JP | 2020-113086 | 7/2020 |
| JP | 2020-160708 | 10/2020 |
| JP | 2020-166505 | 10/2020 |
| WO | 2020/208731 | 10/2020 |

OTHER PUBLICATIONS

International Search Report for PCT/JP2022/014714 mailed on Jun. 21, 2022.
International Preliminary Report on Patentability for PCT/JP2022/014714 mailed on Oct. 12, 2023.

* cited by examiner

FIG.7

| STORAGE CABINET NUMBER | STORAGE CHAMBER A | | | | STORAGE CHAMBER B | | | | INSTALLA-TION LOCATION |
|---|---|---|---|---|---|---|---|---|---|
| | STORAGE CONDITION | VACANT SPACE | | | STORAGE CONDITION | VACANT SPACE | | | |
| | | L | M | S | | L | M | S | |
| 300-1 | FREEZING (SET AT -20°C) | 3 | 53 | 10 | REFRIGERATION (SET AT +5°C) | 0 | 20 | 100 | ... |
| 300-2 | FREEZING (SET AT -20°C) | 10 | 60 | 9 | FREEZING (SET AT -20°C) | 10 | 50 | 30 | ... |
| 300-3 | REFRIGERATION (SET AT +5°C) | 5 | 50 | 5 | DRY (LEAVE TO NATURAL TEMPERATURE) | 8 | 48 | 50 | ... |
| 300-4 | DRY (LEAVE TO NATURAL TEMPERATURE) | 10 | 60 | 30 | DRY (LEAVE TO NATURAL TEMPERATURE) | 0 | 5 | 25 | ... |

| STORAGE CABINET NUMBER | STORAGE CHAMBER A ||||||||| STORAGE CHAMBER B ||||||||| INSTALLATION LOCATION |
|---|---|---|---|---|---|---|---|---|---|---|---|---|---|---|---|---|---|
| | TEMPERATURE °C | HUMIDITY %Rh | VENTILATION $m^3/h$ | $O_2$ CONCENTRATION % | $CO_2$ CONCENTRATION % | VACANT SPACE ||| TEMPERATURE °C | HUMIDITY %Rh | VENTILATION $m^3/h$ | $O_2$ CONCENTRATION % | $CO_2$ CONCENTRATION % | VACANT SPACE ||| |
| | | | | | | L | M | S | | | | | | L | M | S | |
| 300-1 | -20 | – | NONE | – | – | 3 | 53 | 10 | -1 | – | NONE | – | – | 0 | 20 | 100 | ... |
| 300-2 | -1 | – | NONE | – | – | 10 | 60 | 9 | 5 | – | 50 | – | – | 10 | 50 | 30 | ... |
| 300-3 | 5 | 40% | NONE | – | – | 5 | 50 | 5 | 13 | – | 120 | – | – | 8 | 48 | 50 | ... |
| 300-4 | 13 | – | – | 5% | 5% | 10 | 60 | 30 | – | – | – | – | – | 0 | 5 | 25 | ... |

| MANAGEMENT NUMBER | PURPOSE OF USE | ENVIRONMENT SETTING | SIZE | NAME | TELEPHONE NUMBER | DESIRED SENDING DATE AND TIME | DESIRED RECEPTION DATE AND TIME | SENDING SIDE STORAGE CABINET | INSTALLATION LOCATION (SENDING SIDE) | RECEIVING SIDE STORAGE CABINET | INSTALLATION LOCATION (RECEIVING SIDE) |
|---|---|---|---|---|---|---|---|---|---|---|---|
| 1 | HOME DELIVERY | FREEZING | M | ○○ | ×××-××××  | 2021/3/10 15:00– 2013/3/12 15:00 | 2021/3/14 15:00– 2013/3/16 15:00 | 1-A-1 | ... | 2-B-1 | ... |
| ... | ... | ... | ... | ... | ... | ... | ... | ... | ... | ... | ... |

| PURPOSE OF USE | | HOME DELIV-ERY ☑ | USER LOCKER ☐ | |
|---|---|---|---|---|
| CARGO | NAME | | | |
| | STORAGE TEMPERATURE | NORMAL TEMPER-ATURE ☐ | CHILLED ☐ | FREEZE ☑ |
| | SIZE | L ☐ | M ☑ | S ☐ |
| SENDER | ADDRESS | | | |
| | NAME | | | |
| | TELEPHONE NUMBER (E-MAIL ADDRESS) | | | |
| | DESIRED SENDING DATE AND TIME | ○○○○ YEAR ○○ MONTH ○○ DATE 00:00 ~ ○○ MONTH ○○ DATE 00:00 | | |
| | SHIPPING SOURCE LOCATION | SPECIFY ON MAP — 143a | | |
| RECIP-IENT | NAME | | | |
| | TELEPHONE NUMBER (E-MAIL ADDRESS) | | | |
| | DESIRED RECEPTION DATE AND TIME | ○○○○ YEAR ○○ MONTH ○○ DATE 00:00 ~ ○○ MONTH ○○ DATE 00:00 | | |
| | ADDRESS | SPECIFY ON MAP — 143b | | |

DISPLAY VACANCY STATUS — 144

FIG.16

| | 8 | 9 | 10 | 11 | 12 | 13 | |
|---|---|---|---|---|---|---|---|
| SHIPPING SOURCE:<br>STORAGE CABINET 300-1<br>ADDRESS) 〒○○○-○○○○<br>○○○ CITY<br>○○ WARD ○○<br>... | FEBRUARY 25, 2021 (FRIEND-PULLING DAY) | | | | | | ADDITIONAL<br>FEE IS CHARGED<br>+○○ YEN |
| SHIPPING SOURCE:<br>STORAGE CABINET 300-N<br>ADDRESS) 〒○○○-○○○○<br>○○○ CITY<br>○○ WARD ○○<br>... | FEBRUARY 25, 2021 (FRIEND-PULLING DAY) | | | | | | ADDITIONAL<br>FEE IS CHARGED<br>+○○ YEN |
| RECIPIENT:<br>STORAGE CABINET 300-2<br>ADDRESS) 〒○○○-○○○○<br>○○○ CITY<br>○○ WARD ○○<br>... | FEBRUARY 25, 2021 (FRIEND-PULLING DAY) | | | | | | ADDITIONAL<br>FEE IS CHARGED<br>+○○ YEN |

| PURPOSE OF USE | | HOME DELIV- ERY ☐ | USER LOCKER ☑ | |
|---|---|---|---|---|
| CARGO | STORAGE TEMPERATURE | NORMAL TEMPER- ATURE ☐ | CHILLED ☐ | FREEZE ☑ |
| | SIZE | L ☐ | M ☐ | S ☑ |
| USER | ADDRESS | | | |
| | NAME | | | |
| | TELEPHONE NUMBER (E-MAIL ADDRESS) | | | |
| | DESIRED STORAGE PERIOD | ○○○○ YEAR ○○ MONTH ○○ DATE 00:00 ~ ○○ MONTH ○○ DATE 00:00 | | |
| | STORAGE LOCATION | SPECIFY ON MAP | | |

DISPLAY VACANCY STATUS

FIG.18

| PURPOSE OF USE | | ☑ LONG-TERM STORAGE | | |
|---|---|---|---|---|
| CARGO | NAME | | | |
| | SIZE | L ☐ | M ☐ | S ☐ |
| | STORAGE TEMPERATURE | °C | | |
| | HUMIDITY SETTING | ☐ LEAVE TO NATURAL HUMIDITY | ☐ DEHUMIDIFICATION XX %Rh | |
| | VENTILATION REQUIREMENT | ☐ NECESSARY | ☐ NOT NECESSARY | ☐ CA STORAGE |
| | CA STORAGE | $O_2$ CONCENTRATION | % | |
| | | $CO_2$ CONCENTRATION | % | |
| USER | ADDRESS | | | |
| | NAME | | | |
| | TELEPHONE NUMBER (E-MAIL ADDRESS) | | | |
| | DESIRED STORAGE PERIOD | ○○○ YEAR ○○ MONTH ○○ DATE 00:00 ~ ○○ MONTH ○○ DATE 00:00 | | |
| | STORAGE LOCATION | SPECIFY ON MAP | | |

[DISPLAY VACANCY STATUS]

MANAGEMENT APPARATUS, MANAGEMENT SYSTEM, MANAGEMENT METHOD AND MANAGEMENT PROGRAM

TECHNICAL FIELD

The present disclosure relates to a management apparatus, a management system, a management method, and a management program for managing a storage cabinet.

BACKGROUND ART

Conventionally, a technology for managing the vacancy status of a stocker used for storing a package has been known. Specifically, it is known that, for example, among stockers that are used for delivering articles delivered from a store to a purchaser, a stocker that is in a vacant state is searched, reserved, and determined as a delivery destination.

CITATION LIST

Patent Document

Patent document 1: Japanese Unexamined Patent Application Publication No. 2019-101857
Patent document 2: Japanese Unexamined Patent Application Publication No. 2001-151315

SUMMARY OF INVENTION

Technical Problem

In the conventional technique described above, it is not possible to present to the user whether the vacant storage cabinet is a storage cabinet in an environment suitable for storing a package.

The present disclosure provides a management apparatus, a management system, a management method and a management program for presenting the vacancy status of a storage cabinet suitable for storing a package.

Solution to Problem

The first aspect of the present disclosure is
a management apparatus for managing a status of a plurality of storage cabinets whose use can be changed, the management apparatus including
a managing unit configured to collect storage cabinet information including the use of the plurality of storage cabinets and information relating to a usage status of the plurality of storage cabinets, and store the storage cabinet information in a storage unit;
an acquiring unit configured to acquire information relating to a package to be stored;
a storage cabinet managing unit configured to change the use of the storage cabinet; and
an output unit configured to output information indicating a vacancy status of the storage cabinet corresponding to the use of the package, based on the information relating to the package and the storage cabinet information.

According to the first aspect of the present disclosure, the vacancy status of a storage cabinet suitable for the storage of a package can be presented. According to the first aspect, the use of the storage cabinet can be changed according to the vacancy status of the storage cabinet.

Further, the second aspect of the present disclosure is the management apparatus according to the first aspect, wherein
the storage cabinet information includes position information indicating an installation location of each of the plurality of storage cabinets, and
the storage cabinet managing unit changes the use of the storage cabinet based on the information relating to the package and the position information.

According to the second aspect of the present disclosure, when there is no space in the storage cabinet installed at the specified location, the use of the storage cabinet installed close to the specified location can be changed to create a vacant space.

Further, the third aspect of the present disclosure is the management apparatus according to the first or second aspect, wherein the storage cabinet managing unit identifies the storage cabinet whose use is to be changed when the storage cabinet that can store the package cannot be identified, and changes the use of the identified storage cabinet to the use corresponding to the use of the package.

According to the third aspect of the present disclosure, when there is no space in the storage cabinet corresponding to the package, the use of the storage cabinet can be changed to create a vacant space.

Further, the fourth aspect of the present disclosure is the management apparatus according to the first to third aspects, wherein the storage cabinet managing unit gives an instruction of an environment target value in the storage cabinet, to the storage cabinet including a refrigeration control unit or a freezing control unit, to change the use of the storage cabinet.

According to the fourth aspect of the present disclosure, the managing apparatus can control the environment in the storage cabinet.

Further, the fifth aspect of the present disclosure is the management apparatus according to the first to fourth aspects, wherein a location where the storage cabinet is installed can be changed.

According to the fifth aspect of the present disclosure, the storage cabinet can be installed at any location.

Further, the sixth aspect of the present disclosure is the management apparatus according to the first to fifth aspects, wherein
the information relating to the package includes a size of the package, a number of the packages, and an environment setting corresponding to the package, and
the output unit outputs, as the information indicating the vacancy status, information indicating the storage cabinet having the use corresponding to the environment setting of the package and that has a vacant space corresponding to the size of the package and the number of the packages.

According to the sixth aspect of the present disclosure, the vacancy status of the storage cabinet corresponding to the package can be presented to the user.

Further, the seventh aspect of the present disclosure is the management apparatus according to the first to sixth aspects, wherein
the information relating to the package includes a shipping source location of the package, a scheduled delivery date of the package, and an environment setting corresponding to the package, and
the output unit outputs, as the information indicating the vacancy status, information indicating the storage cabinet having the use corresponding to the environment setting of the package and that is installed closest to the shipping source location of the package and information indicating a time period during which the storage cabinet can be used.

According to the seventh aspect of the present disclosure, the user can be presented with the closest storage cabinet and the time period when the storage cabinet can be used.

Further, the eighth aspect of the present disclosure is the management apparatus according to the first to seventh aspects, wherein
- the information relating to the package includes a size of the package, a number of the packages, a shipping source location of the package, a scheduled delivery date of the package, and an environment setting corresponding to the package, and
- the output unit outputs, as the information indicating the vacancy status, vehicle information indicating a vehicle mounted with the storage cabinet having the use corresponding to the environment setting of the package and that has a vacant space corresponding to the size of the package and the number of the packages, and information indicating an arrival date and time when the vehicle arrives at the shipping source location for the package.

According to the eighth aspect of the present disclosure, information on the vehicle transporting the package and the arrival date and time at the shipping source location can be presented to the user.

Further, the ninth aspect of the present disclosure is the management apparatus according to the first to eighth aspects, wherein
- the acquiring unit acquires, from an external device, the information relating to the package to be stored input to the external device by a user, and
- the output unit outputs, to the external device, the information indicating the vacancy status of the storage cabinet corresponding to the use of the package input by the user.

According to the ninth aspect of the present disclosure, the vacancy status of the storage cabinet can be presented to the user who input information relating to the package.

Further, the tenth aspect of the present disclosure is the management apparatus according to the ninth aspect, wherein
- an updating unit configured to update the information relating to the usage status of the storage cabinet that is selected, when the storage cabinet is selected at the external device.

According to the tenth aspect of the present disclosure, the vacancy status of the storage cabinet selected by the user can be presented to the user of the external device.

The eleventh aspect of the present disclosure is
a management system including
a plurality of storage cabinets whose use can be changed; and
a management apparatus configured to manage a status of the plurality of storage cabinets, wherein
the management apparatus includes:
- a managing unit configured to collect storage cabinet information including the use of the plurality of storage cabinets and information relating to a usage status of the plurality of storage cabinets, and store the storage cabinet information in a storage unit;
- an acquiring unit configured to acquire information relating to a package to be stored;
- a storage cabinet managing unit configured to change the use of the storage cabinet; and
- an output unit configured to output information indicating a vacancy status of the storage cabinet corresponding to the use of the package, based on the information relating to the package and the storage cabinet information.

According to the eleventh aspect of the present disclosure, the vacancy status of a storage cabinet suitable for storing the package can be presented. According to the eleventh aspect, the use of the storage cabinet can be changed according to the vacancy status of the storage cabinet.

The twelfth aspect of the present disclosure is
a management method of a storage cabinet performed by a management apparatus for managing a status of a plurality of storage cabinets whose use can be changed, the management method being performed by the management apparatus by:
collecting storage cabinet information including the use of the plurality of storage cabinets and information relating to a usage status of the plurality of storage cabinets, and storing the storage cabinet information in a storage unit;
acquiring information relating to a package to be stored;
changing the use of the storage cabinet; and
outputting information indicating a vacancy status of the storage cabinet corresponding to the use of the package, based on the information relating to the package and the storage cabinet information.

According to the twelfth aspect of the present disclosure, the vacancy status of a storage cabinet suitable for storing a package can be presented. According to the twelfth aspect, the use of the storage cabinet can be changed according to the vacancy status of the storage cabinet.

The thirteenth aspect of the present disclosure is
a management program that causes a management apparatus to execute a process, the management apparatus managing a status of a plurality of storage cabinets whose use can be changed, the process including
collecting storage cabinet information including the use of the plurality of storage cabinets and information relating to a usage status of the plurality of storage cabinets, and storing the storage cabinet information in a storage unit;
acquiring information relating to a package to be stored;
changing the use of the storage cabinet; and
outputting information indicating a vacancy status of the storage cabinet corresponding to the use of the package, based on the information relating to the package and the storage cabinet information.

According to the thirteenth aspect of the present disclosure, the vacancy status of a storage cabinet suitable for storing a package can be presented. According to the thirteenth aspect, the use of the storage cabinet can be changed according to the vacancy status of the storage cabinet.

BRIEF DESCRIPTION OF DRAWINGS

FIG. 7 is a diagram illustrating an example of a storage cabinet information database.

FIG. 8 is a diagram illustrating another example of a storage cabinet information database.

FIG. 9 is a diagram illustrating an example of a package information database.

FIG. 14 illustrates a first example of a display.

FIG. 16 illustrates a second example of a display.

FIG. 17 illustrates a third example of a display.

FIG. 18 illustrates a fourth example of a display.

DESCRIPTION OF EMBODIMENTS

Figure 1:
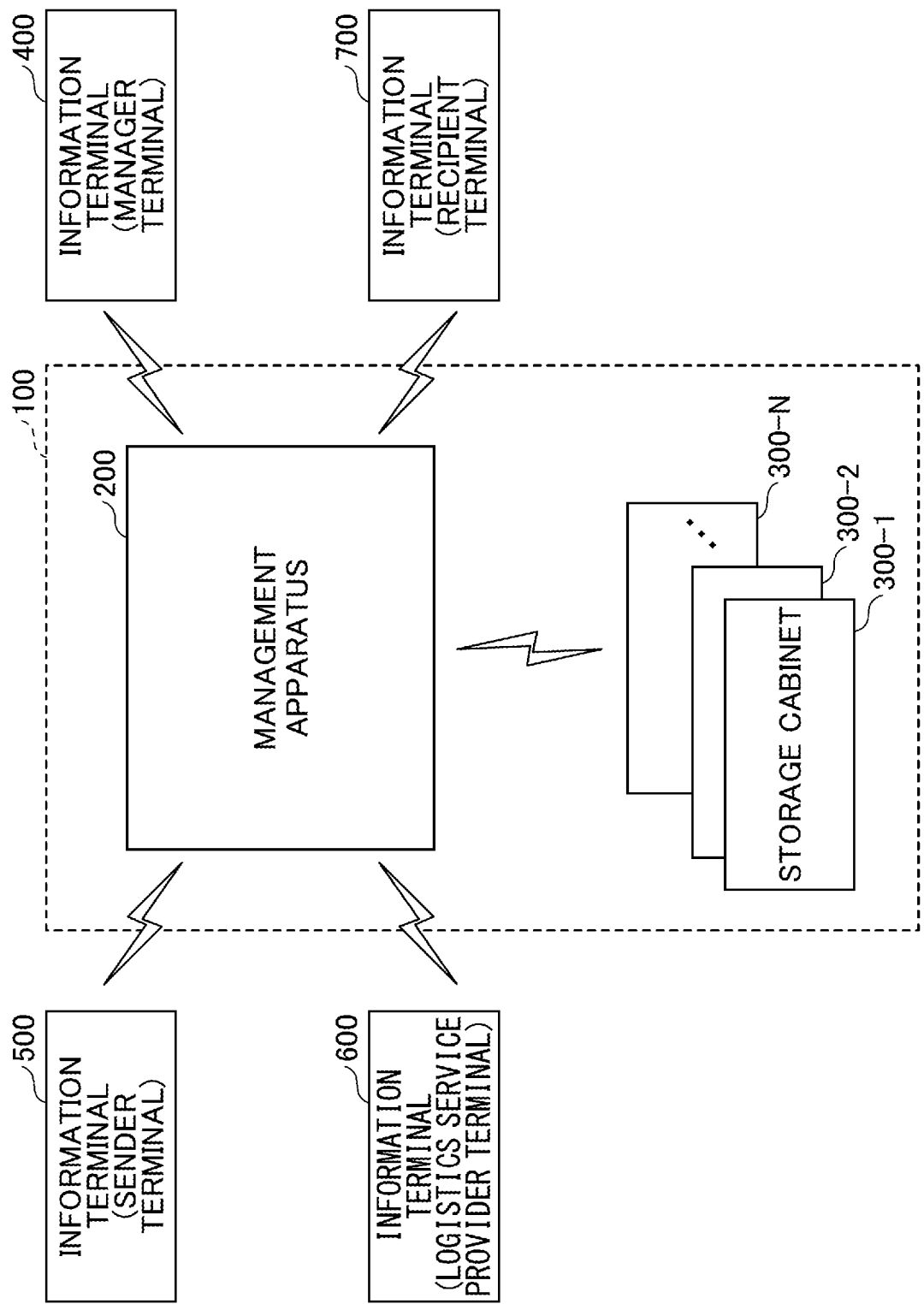
FIG. 1 is a diagram illustrating an example of a system configuration of the management system of the present embodiment.

The present embodiment will be described below with reference to the drawings. FIG. 1 is a diagram illustrating an example of a system configuration of a management system of the present embodiment.

A management system 100 of the present embodiment includes a management apparatus 200 and a plurality of storage cabinets 300-1, 300-2, . . . , 300-N. In the management system 100, the management apparatus 200 and the plurality of storage cabinets 300-1, 300-2, . . . , 300-N are connected via a network or the like. In the following description, when the plurality of storage cabinets 300-1, 300-2, . . . , 300-N are not distinguished from each other, the storage cabinets are referred to as the storage cabinets 300.

The management apparatus 200 of the present embodiment manages the vacancy status of the storage cabinets 300. When the management apparatus of the present embodiment receives a request to use the storage cabinet 300 from the user of the management system 100, the management apparatus 200 presents the vacancy status of the storage cabinets 300 having the use corresponding to the package to be used based on the package information relating to the package input by the user. Details of the management apparatus 200 will be described later.

The storage cabinet 300 of the present embodiment can be used for multiple uses and is a mobile type storage cabinet 300 installed at any location. Details of the storage cabinet 300 will be described later.

The management system 100 of the present embodiment communicates with information terminals 400, 500, and 600.

The information terminal 400 of the present embodiment is mainly an information terminal used by the administrator and the like of the management system 100. In the following description, the information terminal 400 may be referred to as the manager terminal 400. The manager terminal 400 mainly browses various kinds of information managed by the management apparatus 200, receives a report of information update by the management apparatus 200, and the like.

The information terminal 500 of the present embodiment is mainly an information terminal used by a sender who sends a package by using the management system 100. In the following description, the information terminal 500 may be referred to as the sender terminal 500. For example, the sender terminal 500 may input package information, display information indicating the vacancy status of the storage cabinets 300 having the use suitable for the package, specify the storage cabinet 300 of the shipping source, and the like.

The information terminal 600 of the present embodiment is mainly an information terminal used by a logistics service provider for transporting a package stored by a sender in the storage cabinet 300 that is the shipping source to the storage cabinet 300 specified as a destination. In the following description, the information terminal 600 may be referred to as a logistics service provider terminal 600.

The logistics service provider terminal 600 transmits, to the management apparatus 200, a report indicating that the package to be transported has been output from the storage cabinet 300 specified as the shipping source, and transmits, to the management apparatus 200, a report indicating that the transported package has been input to the storage cabinet 300 specified as the delivery destination, for example.

The information terminal 700 of the present embodiment is mainly used by the recipient of the package. In the following description, the information terminal 700 may be referred to as the recipient terminal 700. The recipient terminal 700 receives, for example, a report from the management apparatus 200 indicating that the input of the package to the delivery destination has been completed. Further, the recipient terminal 700 transmits, for example, a report to the management apparatus 200 indicating that the package to be received has been output from the storage cabinet 300 specified as the delivery destination.

Figure 2:
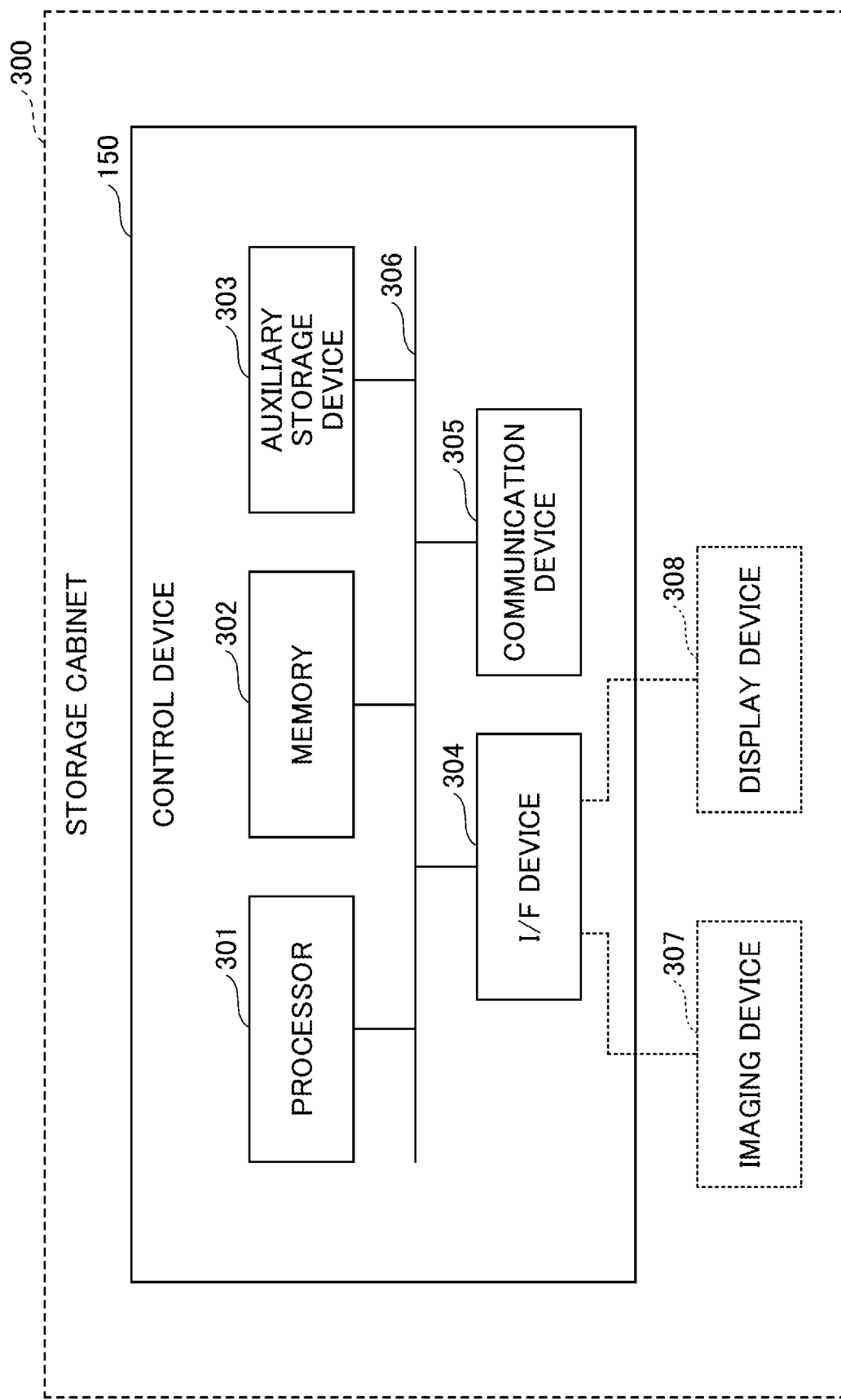
FIG. 2 is a diagram illustrating an example of a hardware configuration of a control device in a storage cabinet.
Figure 3:
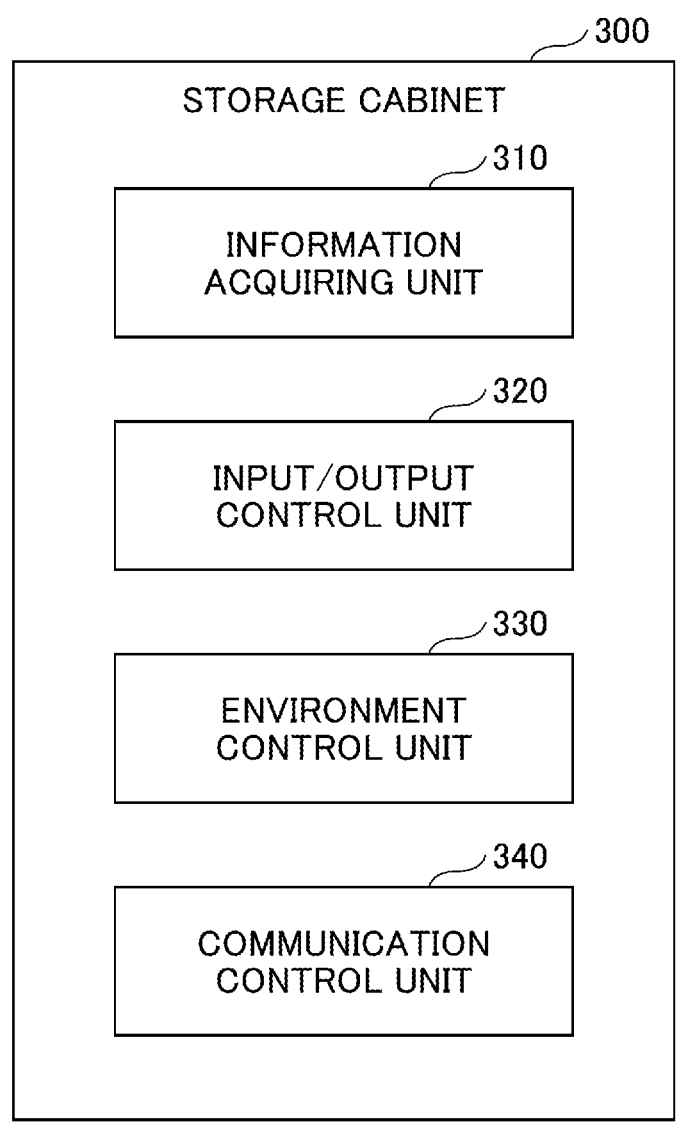
FIG. 3 is a diagram illustrating functions implemented by a control device in a storage cabinet.

Next, the storage cabinet 300 of the present embodiment will be described with reference to FIGS. 2 to 4. The storage cabinet 300 of the present embodiment has a control device 150 for controlling the operation of the storage cabinet 300. The hardware configuration of the control device 150 of the storage cabinet 300 of the present embodiment will be described below with reference to FIG. 2. FIG. 2 is a diagram illustrating an example of the hardware configuration of the control device of the storage cabinet.

The control device 150 of the storage cabinet 300 includes a processor 301, a memory 302, and an auxiliary storage device 303. The control device 150 of the storage cabinet 300 includes an I/F (interface) device 304 and a communication device 305. The pieces of hardware of the control device 150 are connected to each other via a bus 306.

The processor 301 includes various computing devices such as a CPU (Central Processing Unit). The processor 301 reads and executes various programs on the memory 302.

The memory 302 has a main storage device such as a ROM (Read Only Memory) and a RAM (Random Access Memory). The processor 301 and the memory 302 form what is referred to as a computer, and the control device 150 of the storage cabinet 300 implements various functions by executing various programs read on the memory 302 by the processor 301.

The auxiliary storage device 303 stores various programs and various kinds of data used when various programs are executed by the processor 301.

The I/F device 304 is a connection device that connects the control device 150 of the storage cabinet 300 with other devices. In the present embodiment, other devices include an imaging device 307 and a display device 308.

The imaging device 307 of the present embodiment reads the package information as a QR code (registered trademark), for example, when the code is displayed on the logistics service provider terminal 600 or the recipient terminal 700. The display device 308 displays, for example, information for guiding the input and output of the package, to the sender, the logistics service provider, the recipient, etc.

The communication device 305 is a communication device that transmits and receives information between the control device 150 of the storage cabinet 300 and the management apparatus 200.

Next, with reference to FIG. 3, the functions of the storage cabinet 300 implemented by the control device 150 of the storage cabinet 300 will be described. FIG. 3 is a diagram for explaining the functions implemented by the control device of the storage cabinet. The functions illustrated in FIG. 3 are implemented in the storage cabinet 300 of the present embodiment by executing a program read out on the memory 302 by the processor 301.

The storage cabinet 300 of the present embodiment includes an information acquiring unit 310, an input/output control unit 320, an environment control unit 330, and a communication control unit 340.

The information acquiring unit 310 acquires package information input by the sender terminal 500 from, for example, the management apparatus 200, the logistics service provider terminal 600, the recipient terminal 700, and the like.

The input/output control unit 320 controls the input/output of the specified package according to the user's operation. The user of the present embodiment includes, for example, a sender who inputs the package to the storage cabinet 300 specified as the shipping source, a logistics service provider who outputs the package from the storage cabinet 300 specified as the shipping source and inputs the package into the storage cabinet 300 specified as the delivery destination, and a recipient who outputs the package from the storage cabinet 300 that is the delivery destination.

The environment control unit 330 changes the use of the storage cabinet 300 according to an instruction from the management apparatus 200. Specifically, the storage cabinet 300 controls the internal temperature, etc., of the storage cabinet 300 according to an instruction from the management apparatus 200. That is, the environment control unit 330 is an example of a refrigeration function, a refrigeration control unit for controlling a freezing function, and a freezing control unit of the storage cabinet 300.

The communication control unit 340 controls communication between the storage cabinet 300 and the management apparatus 200.

Next, an outline of the structure of the storage cabinet 300 of the present embodiment will be described with reference to FIG. 4. FIG. 4 is a diagram for explaining an outline of the structure of the storage cabinet.

Figure 4:
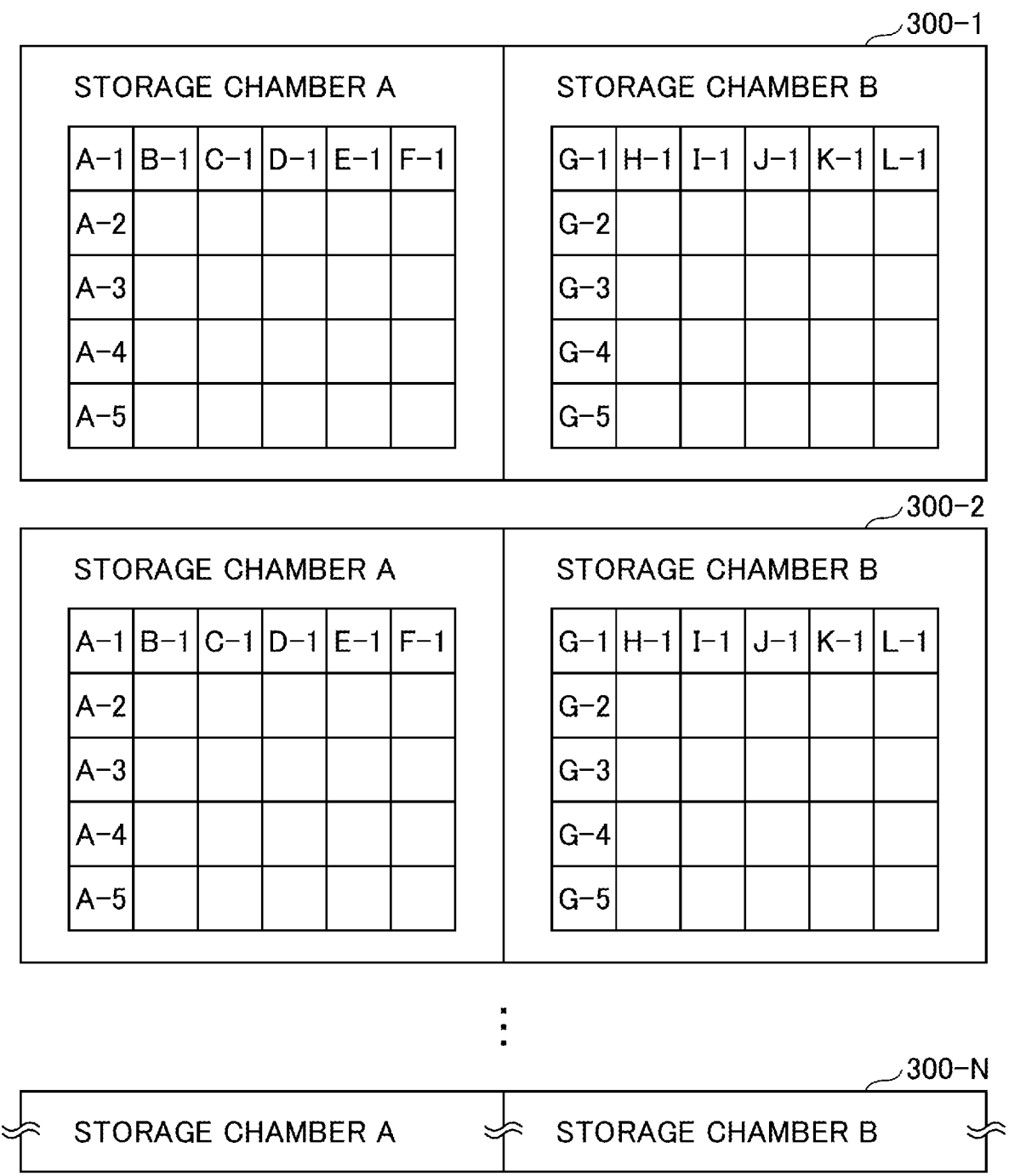
FIG. 4 is a diagram schematically explaining the structure of a storage cabinet.

As illustrated in FIG. 4, the storage cabinet 300 is provided with a plurality of storage cabinets having different uses, and each storage cabinet is provided with shelves for storing a package individually.

Specifically, the storage cabinet 300-1 has storage chambers A and B, wherein the storage chamber A is a freezing storage chamber and the storage cabinet B is a refrigeration storage chamber. That is, the storage cabinet 300-1 has a freezing function and a refrigeration function. The storage cabinet A includes a plurality of shelves such as shelves A-1 and A-2. The plurality of shelves included in the storage chamber A include shelves of a plurality of different sizes, and packages are stored on each shelf. The storage chamber B also includes a plurality of shelves such as shelves G-1 and G-2. The plurality of shelves included in the storage chamber B include shelves of a plurality of sizes.

Similar to the storage cabinet 300-1, the storage cabinet 300-2 also includes a storage chamber A and a storage chamber B having different uses, and each storage chamber includes shelves of a plurality of sizes. In the storage cabinet 300-2, for example, the storage chamber A may be a refrigeration storage chamber and the storage chamber B may be a freezing storage chamber.

Further, for example, the storage cabinet 300-N may have a storage chamber for a use other than a freezing storage chamber and a refrigeration storage chamber. Specifically, the storage cabinet 300-N may have a chilled storage chamber or the like.

Next, the management apparatus 200 of the present embodiment will be described. First, the hardware configuration of the management apparatus 200 of the present embodiment will be described with reference to FIG. 5.

Figure 5:
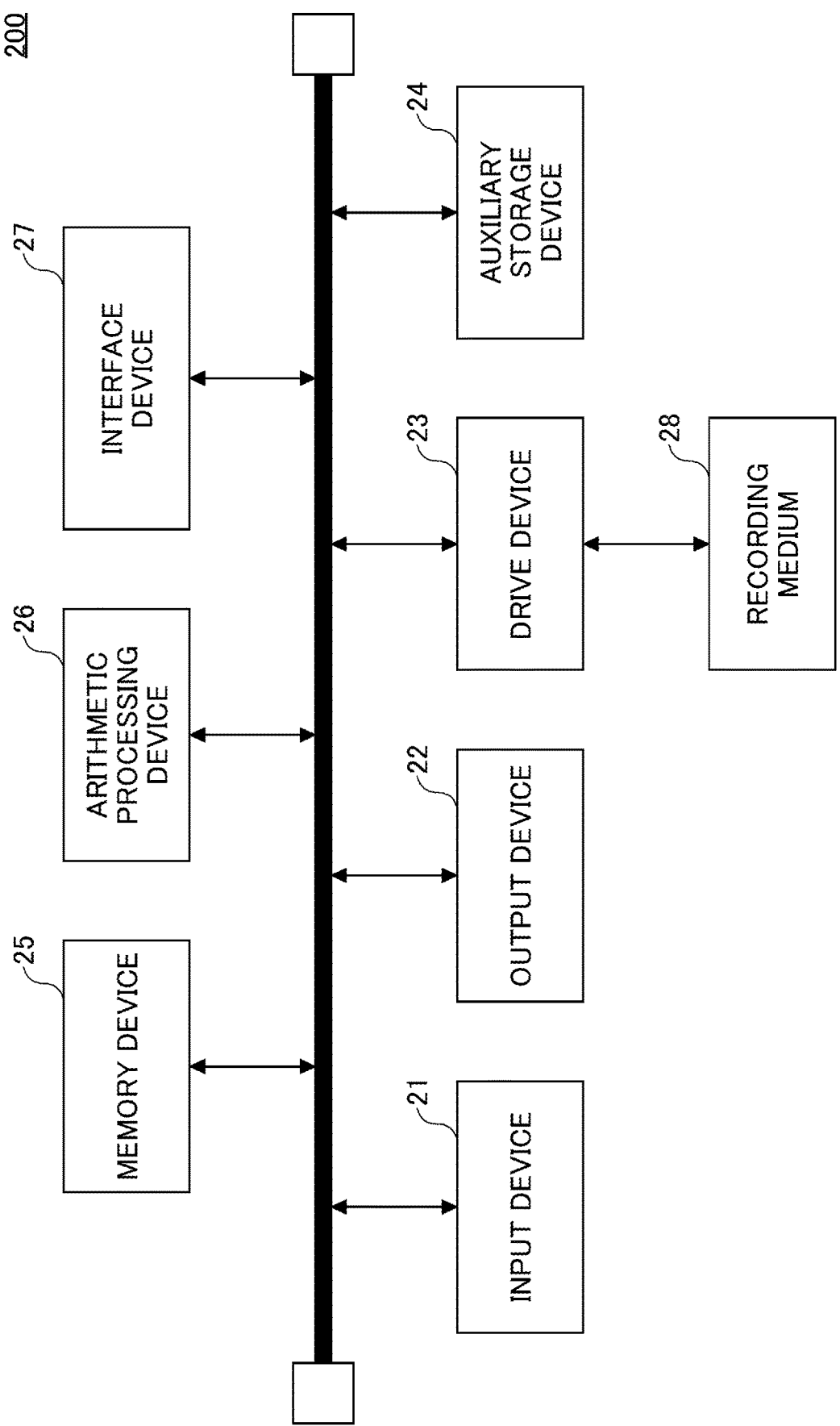
FIG. 5 is a diagram illustrating an example of a hardware configuration of a management apparatus.

FIG. 5 is a diagram illustrating an example of the hardware configuration of the management apparatus.

The management apparatus 200 of the present embodiment is a computer including an input device 21, an output device 22, a drive device 23, an auxiliary storage device 24, a memory device 25, an arithmetic processing device 26, and an interface device 27, which are connected to each other by a bus.

The input device 21 is a device for inputting various kinds of information, and is implemented by, for example, a keyboard or a pointing device. The output device 22 is for outputting various kinds of information, and is implemented by, for example, a display. The interface device 27 includes a LAN card and the like and is used for connecting to a network.

The management program for implementing the function of the management apparatus 200 described later is at least a part of various programs for controlling the management apparatus 200. The management program is provided by, for example, distributing a recording medium 28 or by being downloaded from a network. As the recording medium 28 on which the management program is recorded, various types of storage media can be used, including a storage medium which records information optically, electrically, or magnetically, such as a CD-ROM, a flexible disk, a magneto-optical disk, or the like, a ROM, a semiconductor memory which records information electrically, such as a flash memory or the like.

When the recording medium 28 in which the management program is recorded is set in the drive device 23, the management program is installed from the recording medium 28 to the auxiliary storage device 24 via the drive device 23. The management program downloaded from the network is installed in the auxiliary storage device 24 via the interface device 27.

The auxiliary storage device 24 implements each storage unit and the like of the management apparatus 200, and stores the management program installed in the management apparatus 200 and stores various files, various kinds of data, and the like required by the management apparatus 200. The memory device 25 reads the management program from the auxiliary storage device 24 and stores the management program, when the management apparatus 200 is activated. The arithmetic processing device 26 is, for example, a CPU (Central Processing Unit), a microcomputer, a processor, etc., and implements various kinds of processing as described later in accordance with a management program stored in the memory device 25.

The information terminals 400, 500, 600, and 700 of the present embodiment are computers having an arithmetic processing device and a storage device. The information terminals 400, 500, 600, and 700 may be, for example, portable tablet terminals or smart phones.

Figure 6:
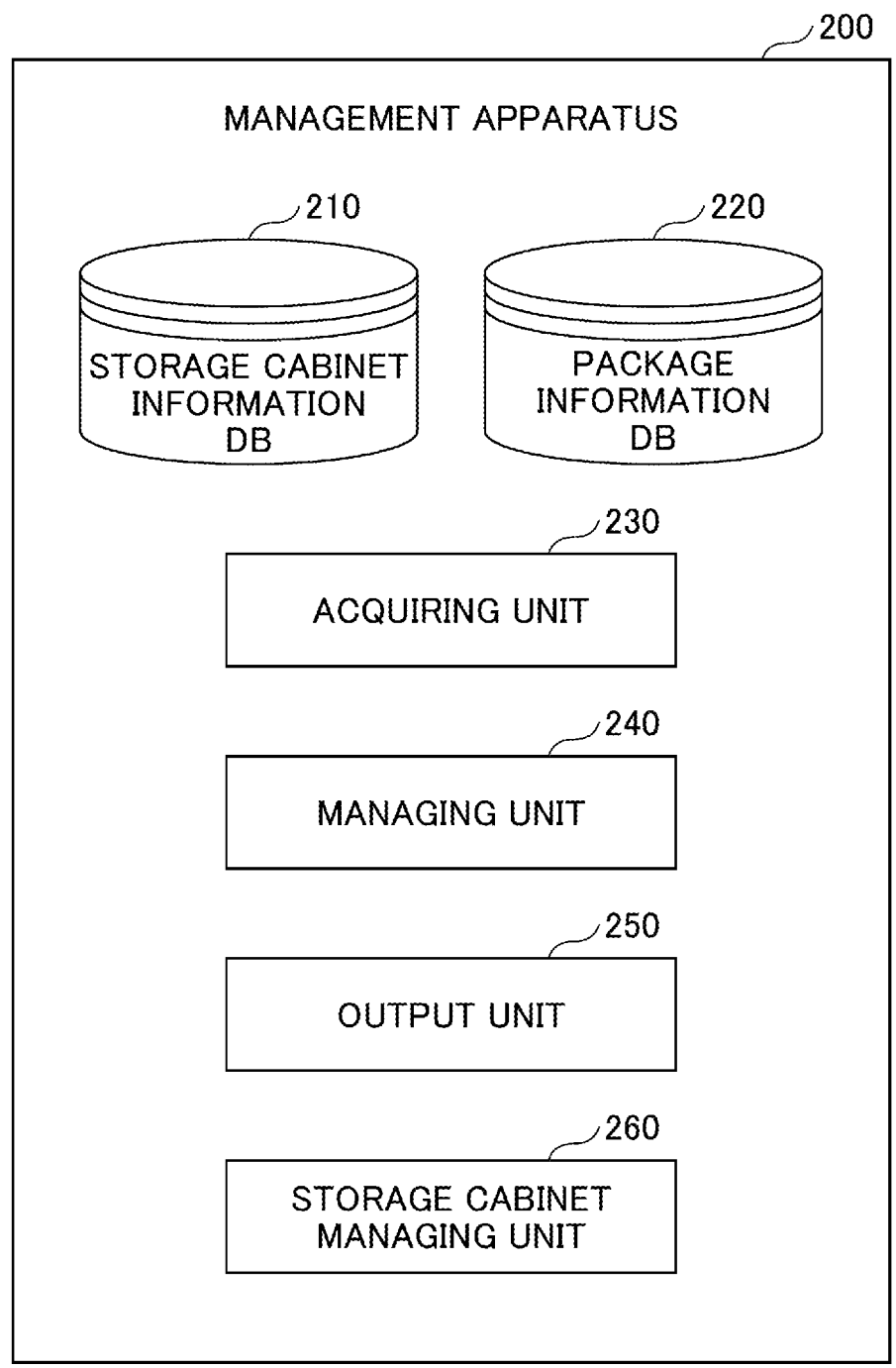
FIG. 6 is a diagram illustrating a function of a management apparatus.

Next, with reference to FIG. 6, the functions of the management apparatus 200 of the present embodiment will be described. FIG. 6 is a diagram for explaining the functions of the management apparatus.

The management apparatus 200 of the present embodiment includes a storage cabinet information database 210, a package information database 220, an acquiring unit 230, a managing unit 240, an output unit 250, and a storage cabinet managing unit 260.

The storage cabinet information database 210 and the package information database 220 are implemented by, for example, an auxiliary storage device 24 or the like of the management apparatus 200. The acquiring unit 230, the managing unit 240, the output unit 250, and the storage cabinet managing unit 260 are implemented by the arithmetic processing device 26 of the management apparatus 200 reading and executing a program stored in the memory device 25 or the like.

The storage cabinet information database 210 stores information relating to the storage cabinet 300 included in the management system 100. The package information database 220 stores package information relating to packages input from the sender terminal 500. Details of the storage cabinet information database 210 and the package information database 220 will be described later.

The acquiring unit 230 acquires various kinds of information. Specifically, whenever information relating to a package is input from the sender terminal 500, the acquiring unit 230 stores the information in the package information database 220 as package information to which a management number is assigned.

The managing unit 240 manages storage cabinet information stored in a storage cabinet information database 210. Specifically, when there is a change in the usage status of the storage cabinet 300, the managing unit 240 collects storage cabinet information including the usage status of the storage cabinet from each storage cabinet 300 and updates the storage cabinet information database 210. That is, the managing unit 240 is an example of an updating unit that updates storage cabinet information.

The managing unit 240 refers to the package information and the storage cabinet information database 210, and identifies the storage cabinet 300 that satisfies the condition indicated by the package information. That is, the managing unit 240 acquires information indicating the use indicated by the package information and the vacancy status of the corresponding storage cabinet 300.

The output unit 250 outputs information indicating the vacancy status of the storage cabinet 300 identified by the managing unit 240, to the sender terminal 500 or the like.

The storage cabinet managing unit 260 instructs the storage cabinet 300 to change the use of the storage chamber. Specifically, the storage cabinet managing unit 260 instructs the storage cabinet 300-1, for example, to change the storage chamber A from a freezing storage chamber to a refrigeration storage chamber.

Next, the storage cabinet information database 210 will be described with reference to FIGS. 7 and 8.

FIG. 7 is a diagram illustrating an example of the storage cabinet information database. The storage cabinet information database 210 of the present embodiment is an example of a storage unit in which storage cabinet information is stored. FIG. 7 illustrates the status of the year ○○○○ month ΔΔ datex(00:00) to month ΔΔ datex(00:00).

The storage cabinet information stored in the storage cabinet information database 210 of the present embodiment includes the storage cabinet number, the storage chamber name (storage chamber A, storage chamber B), and the installation location as items of information, each of which being associated with each other. The storage cabinet number is identification information for identifying the storage cabinet 300, and the installation location is position information indicating the location where the storage cabinet 300 is installed. The storage condition and the vacant space for each shelf size are associated with the storage chamber name.

The storage condition of the present embodiment is a condition indicating the environment of the storage chamber and includes an environmental target value.

In the example of FIG. 7, the storage chamber A having the storage chamber number "300-1" has a storage condition of freezing, an environmental target value of $-20°$ C., and among the vacant shelves, there are three shelves of size L, 53 shelves of size M, and 10 shelves of size S.

Further, the storage chamber B having the storage chamber number "300-1" has a storage condition of refrigeration, an environmental target value of $+5°$ C., and among the vacant shelves, there are zero shelves of size L, 20 shelves of size M, and 100 shelves of size S.

Thus, the storage cabinet information of the present embodiment includes information relating to the use of the plurality of storage cabinets 300 and the usage status of the plurality of storage cabinets 300.

FIG. 8 is a diagram illustrating another example of the storage cabinet information database. A storage cabinet information database 210A illustrated in FIG. 8 is an example of storage cabinet information in the case where the storage cabinet 300 is highly functional, and illustrates the status of the year ○○○○ month ΔΔ datex(00:00) to month ΔΔ datex(00:00).

The storage cabinet information stored in the storage cabinet information database 210A includes a storage cabinet number, a storage chamber name, and an installation position as information items associated with each other.

In the example of FIG. 8, the temperature, the humidity, the ventilation, the $O_2$ concentration, the $CO_2$ concentration, and vacant space are associated with the storage cabinet name.

In the example of FIG. 8, the storage cabinet 300 can control values such as the temperature, the humidity, the ventilation, the $O_2$ concentration, and the $CO_2$ concentration by the environment control unit 330 according to an instruction from the storage cabinet managing unit 260.

Next, the package information database 220 of the present embodiment will be described with reference to FIG. 9. FIG. 9 is a diagram illustrating an example of a package information database.

The package information stored in the package information database 220 includes, as items of information, a management number, purpose of use, an environment setting, a size, a name, a telephone number, a desired sending date and time, a desired reception date and time, a sending side storage cabinet and an installation location, and a receiving side storage cabinet and an installation location, and the item "management number" is associated with the other items. The items of package information illustrated in FIG. 9 are an example, and items other than the items illustrated in FIG. 9 may be included in the package information.

The value of the item "management number" is identification information for managing the transportation of the package. The value of the item "purpose of use" indicates the purpose of use of the storage cabinet. The value of the item "environment setting" indicates the environment of the storage cabinet used for storing the package. That is, the value of the item "environment setting" indicates the use of the storage cabinet.

The item "size" indicates the size of the package, and the values of the items "name" and "telephone number" indicate the name and telephone number of the sender. The value of the item "desired sending date and time" indicates a desire for the date and time at which the logistics service provider takes out the package that is input to the storage cabinet 300 of the sending side, and the value of the item "desired reception date and time" indicates a desire for the date and time at which the logistics service provider inputs the package to the storage cabinet 300 of the receiving side (delivery destination).

The value of the item "sending side storage cabinet" indicates the storage cabinet 300 reserved by the sender and the storage cabinet 300 to which the sender inputs the package. The value of the item "installation location (shipping source)" indicates the installation location (address) of the storage cabinet 300 to which the sender inputs the package. The value of the item "installation location (receiving side)" indicates the installation location (address) of the storage cabinet 300 from which the recipient takes out the package.

Although not illustrated in FIG. 9, in the package information, information indicating the period from when the storage of the package actually starts to when the package is taken out (from the input to the output) in the storage cabinet 300 on the sending side or the storage cabinet 300 on the receiving side may be associated as an information item. That is, the package information may include the date and time when the package is actually input to the storage cabinet 300 and the date and time when the package is delivered from the storage cabinet 300.

Figure 10:
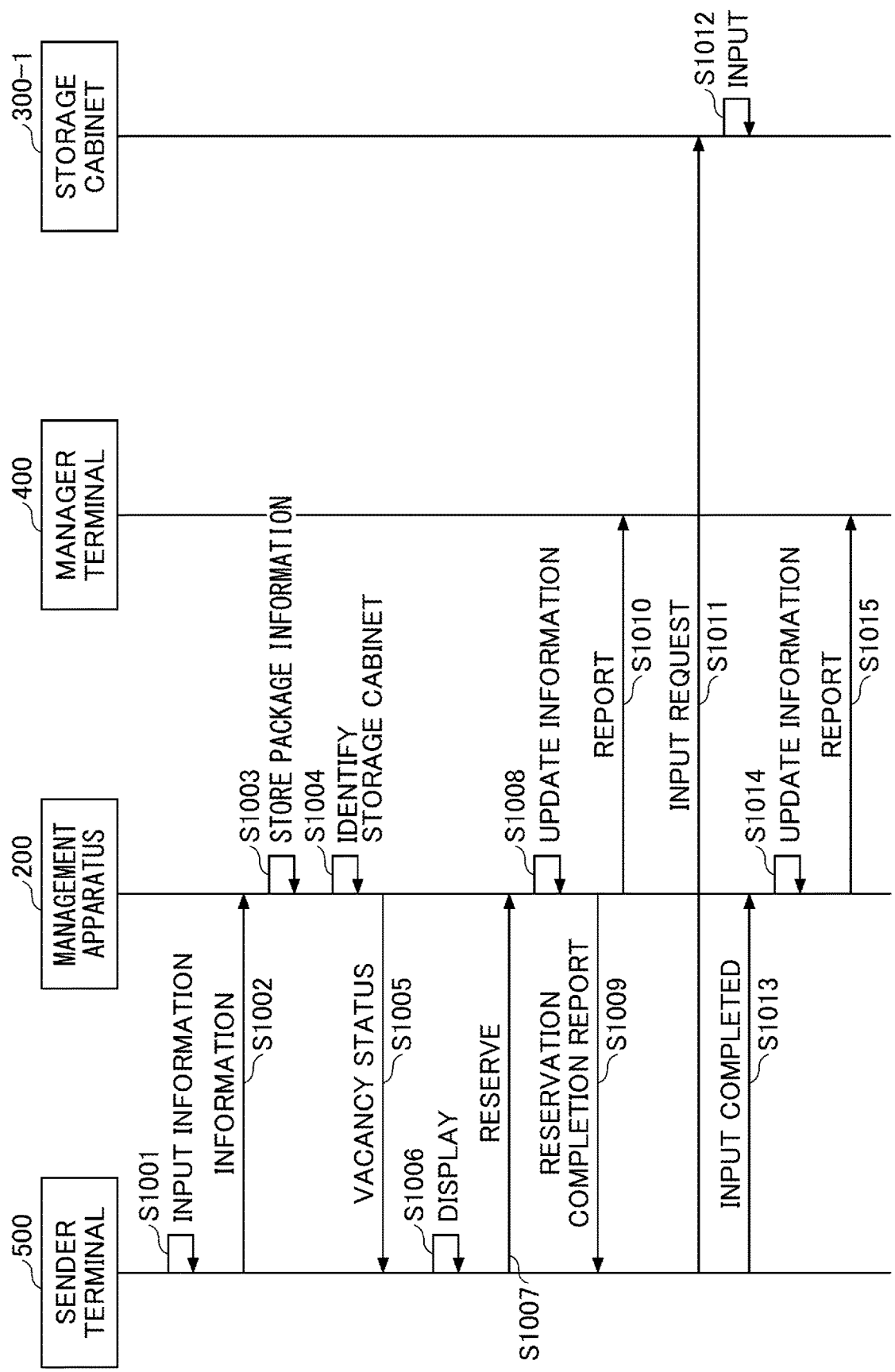
FIG. 10 is a first sequence diagram illustrating the operation of the management system.

Next, the operation of the management system 100 of the present embodiment will be described with reference to FIGS. 10 to 13. FIG. 10 is a first sequence diagram illustrating the operation of the management system. FIG. 10 illustrates the operation of the management system 100 when the storage cabinet 300 satisfying the condition indicated by the package information is identified and the storage cabinet 300-1 is specified by the sender as the storage cabinet 300 for inputting the package.

In the management system 100 of the present embodiment, the sender terminal 500 receives the input of information relating to the package (step S1001). Subsequently, the sender terminal 500 transmits the input information to the management apparatus 200 (step S1002). That is, the sender terminal 500 is an example of an external device by which the sender (user) inputs package information.

When the management apparatus 200 receives the package information from the sender terminal 500, the management apparatus 200 stores the package information in the package information database 220 as package information to which a management number is assigned (step S1003).

Subsequently, the management apparatus 200 refers to the storage cabinet information database 210 by the managing unit 240, and identifies the storage cabinet 300 satisfying the package size, environment setting, the desired sending date and time, the desired reception date and time, etc. included in the package information (step S1004).

Subsequently, the management apparatus 200 transmits information indicating the vacancy status of the storage cabinet to the sender terminal 500 by the output unit 250 (step S1005).

When the sender terminal 500 receives information indicating the vacancy status, the sender terminal 500 displays this information on a display or the like (step S1006).

At this time, in the present embodiment, for example, the storage cabinet 300 may be identified with the condition indicated by the package information being satisfied as the highest priority condition, and the information indicating the vacancy status of the identified storage cabinet 300 may be displayed on the sender terminal 500. In this case, the vacancy status of the storage cabinet 300 satisfying the condition indicated by the package information can be presented to the sender.

Further, in the present embodiment, the storage cabinet 300 may be identified with the condition of being close to the address of the sender as the highest priority condition, and information indicating the available time of the identified storage cabinet 300 may be displayed on the sender terminal 500 as the information indicating the vacancy status. In this case, the time period during which the storage cabinet 300, which is closest to the position of the sender, can be used, can be presented to the sender.

In the present embodiment, for example, the vacancy status of a transport vehicle or the like equipped with the storage cabinet 300 satisfying the condition indicated by the package information may be displayed on the sender terminal 500.

In the present embodiment, information indicating the vacancy status of these plural patterns may be displayed on the sender terminal 500 as a list. In the present embodiment, for example, when inputting the package information, the sender may input the condition to be given the highest priority together with the package information. Subsequently, the sender terminal 500 instructs the management apparatus 200 to reserve delivery of the package (step S1007). Specifically, the sender terminal 500 transmits the specification of the storage cabinet 300 of the shipping source and the sending date and time, and the specification of the storage cabinet 300 of the receiving side and the reception date and time to the management apparatus 200.

When the management apparatus 200 receives the reservation from the sender terminal 500, the managing unit 240 updates the storage cabinet information database 210 and the package information database 220 (step S1008).

Specifically, the managing unit 240 updates the package information in the package information database 220 when the information on the package acquired by the acquiring unit 230 is different from the specification of the storage cabinet 300 of the shipping source and the sending date and time, and the specification of the storage cabinet 300 of the receiving side and the reception date and time when the reservation is accepted. Further, the managing unit 240 updates the vacant space and the vacant time in the storage cabinet information in the storage cabinet information database 210 in accordance with the reservation contents.

Subsequently, the management apparatus 200 reports, to the sender terminal 500, the completion of the reservation (step S1009).

At this time, the management apparatus 200 may transmit to the sender terminal 500 a two-dimensional code or the like in which the information of the reserved package is embedded.

Further, the management apparatus 200 reports, to the manager terminal 400, the reservation for delivery of the package has been made (step S1010). In the present embodiment, the management apparatus 200 reports this to the manager terminal 400, but the present embodiment is not limited to this. The management apparatus 200 does not need to make a report to the manager terminal 400, in which case the reservation status or the like may be displayed on the manager terminal 400 when a browsing request is received from the manager terminal 400 or the like.

Next, the sender terminal 500 requests the reserved storage cabinet 300 to input the package (step S1011).

The input request will be described below. Here, it is assumed that the storage cabinet 300-1 is reserved as the storage cabinet 300 of the shipping source.

In the present embodiment, for example, when the delivery of a package is reserved, the sender brings the package to the reserved storage cabinet 300-1 of the shipping source during the time of the reserved delivery date and time. When the reservation is completed, the sender displays the two-dimensional code received from the management apparatus 200 on the sender terminal 500 and causes the imaging device 307 or the like of the storage cabinet 300-1 to read the two-dimensional code.

In the present embodiment, the two-dimensional code is read by the storage cabinet 300-1, so that the storage cabinet 300-1 receives an input request.

Subsequently, when the storage cabinet 300-1 receives the input request, the input/output control unit 320 receives the input of the package from the sender (step S1012). Then, the storage cabinet 300-1 stores, by the input/output control unit 320, the input package on the shelf of the storage chamber identified based on the package information read from the two-dimensional code displayed on the sender terminal 500.

When the two-dimensional code is read by the storage cabinet 300-1, the sender terminal 500 transmits a report indicating that the input of the package has been completed to the management apparatus 200 (step S1013). The report indicating that the input has been completed may be transmitted from the storage cabinet 300-1 to the management apparatus 200.

Upon receiving the completion of input, the management apparatus 200 updates the package information database 220 so that the package information includes the date and time when the package was actually input to the storage cabinet 300-1 (step S1014).

Subsequently, the management apparatus 200 reports, to the manager terminal 400, that the package information database 220 has been updated (step S1015).

Figure 11:
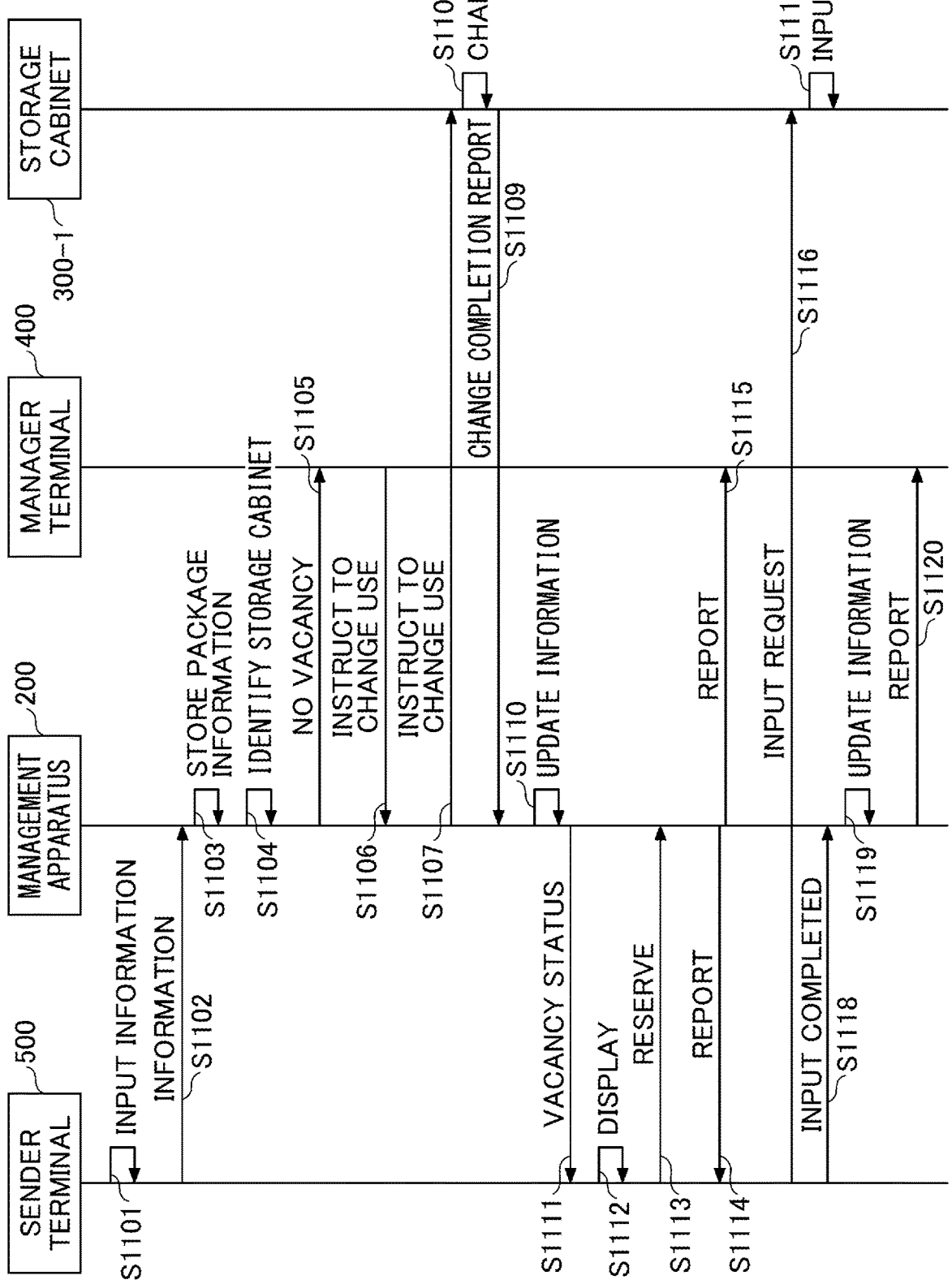
FIG. 11 is a second sequence diagram illustrating the operation of the management system.

Next, referring to FIG. 11, the operation of the management system 100 when the storage cabinet 300 satisfying the condition indicated by the package information is not identified will be described. FIG. 11 is a second sequence diagram explaining the operation of the management system. FIG. 11 illustrates the operation of the management system 100 when the storage cabinet 300 satisfying the condition indicated by the package information is not identified and the use of the storage cabinet 300-1 installed closest to the address of the sender is changed according to the condition indicated by the package information.

The processing from step S1101 to step S1104 in FIG. 11 is the same as the processing from step S1001 to step S1004 in FIG. 10, and, therefore, the description thereof will be omitted.

If the storage cabinet 300 is not identified in step S1104, that is, there is no vacancy in the storage cabinet 300 satisfying the condition desired by the sender, the management apparatus 200 transmits a report indicating that there is no vacancy to the manager terminal 400 (step S1105).

Upon receiving the report, the manager terminal 400 transmits the instruction to change the use of a particular storage cabinet 300 to the management apparatus 200 (step S1106).

At this time, the manager terminal 400 may display a report received from the management apparatus 200 to report to the manager that there is no vacant storage cabinet 300. When the manager specifies the storage cabinet 300 that is the target of the change of use, the manager terminal 400 may transmit information including the storage cabinet number of the specified storage cabinet 300 and the use after the change, to the management apparatus 200 as an instruction to change the use.

The storage cabinet 300 that is the target of the change of use may be identified by the management apparatus 200. In this case, when the management apparatus 200 receives permission for the change of use from the manager terminal 400, the management apparatus 200 may specify the storage cabinet 300 installed closest to the address of the sender, and the specified storage cabinet 300 may be the target of the change of use.

When the management apparatus 200 receives an instruction for the change of use of the storage cabinet 300, the management apparatus 200 instructs the specified storage cabinet 300 to change the use (step S1107). In the example illustrated in FIG. 11, it is assumed that the storage cabinet 300-1 is specified as the target of the change of use, and the instruction for the change of use is transmitted so as to change the storage chamber A from a freezing storage chamber to a refrigeration storage chamber. That is, the management apparatus 200 transmits the environmental target value in the storage cabinet 300-1 to the storage cabinet 300-1.

When the storage cabinet 300-1 is instructed to change the use, the environment control unit 330 sets the environmental target value of the storage chamber A to +5° C. according to the instruction, and changes the use of the storage chamber A from the freezing storage chamber to the refrigeration storage chamber (step S1108).

When the change of use is completed, the storage cabinet 300 transmits a change completion report indicating that the change is completed to the management apparatus 200 (step S1109).

When the management apparatus 200 receives the change completion report, the management apparatus 200 updates the storage cabinet information database 210 in accordance with the change of use (step S1110).

Subsequently, the management apparatus 200 transmits information indicating the vacancy status to the sender terminal 500 (step S1111). Here, for example, information indicating the vacancy status of the storage cabinet 300-1 in which the vacant space of the refrigeration storage chamber has increased due to a change in use, is transmitted.

The processing from step S1112 to step S1120 in FIG. 11 is the same as the processing from step S1006 to step S1015 in FIG. 10, and, therefore, a description thereof will be omitted.

In the example of FIG. 11, the use of the storage cabinet 300 is to be changed when there is no vacancy in the storage cabinet 300 satisfying the condition desired by the sender, but the present embodiment is not limited to this.

In the present embodiment, for example, when the storage cabinet 300 closest to the address of the sender is not the storage cabinet 300 of the use desired by the sender, the use of the storage cabinet 300 closest to the address of the sender may be changed according to the request of the sender.

That is, in the present embodiment, the use of the storage cabinet 300 may be changed based on the package information and the position information indicating the installation location of the storage cabinet 300.

The above is the operation of the management system 100 in inputting the package by the sender. As described above, in the present embodiment, when there is no storage cabinet 300 that satisfies the condition indicated by the package information, the use of the storage cabinet 300 can be changed by changing the environmental target value in the storage chamber of the storage cabinet 300 to make the storage cabinet 300 that satisfies the condition desired by the sender.

Next, with reference to FIG. 12, the operation of the management system 100 in the case where the package input to the storage cabinet 300 of the shipping source is transported to the storage cabinet 300 of the delivery destination (receiving side) by a logistics service provider will be described.

Figure 12:
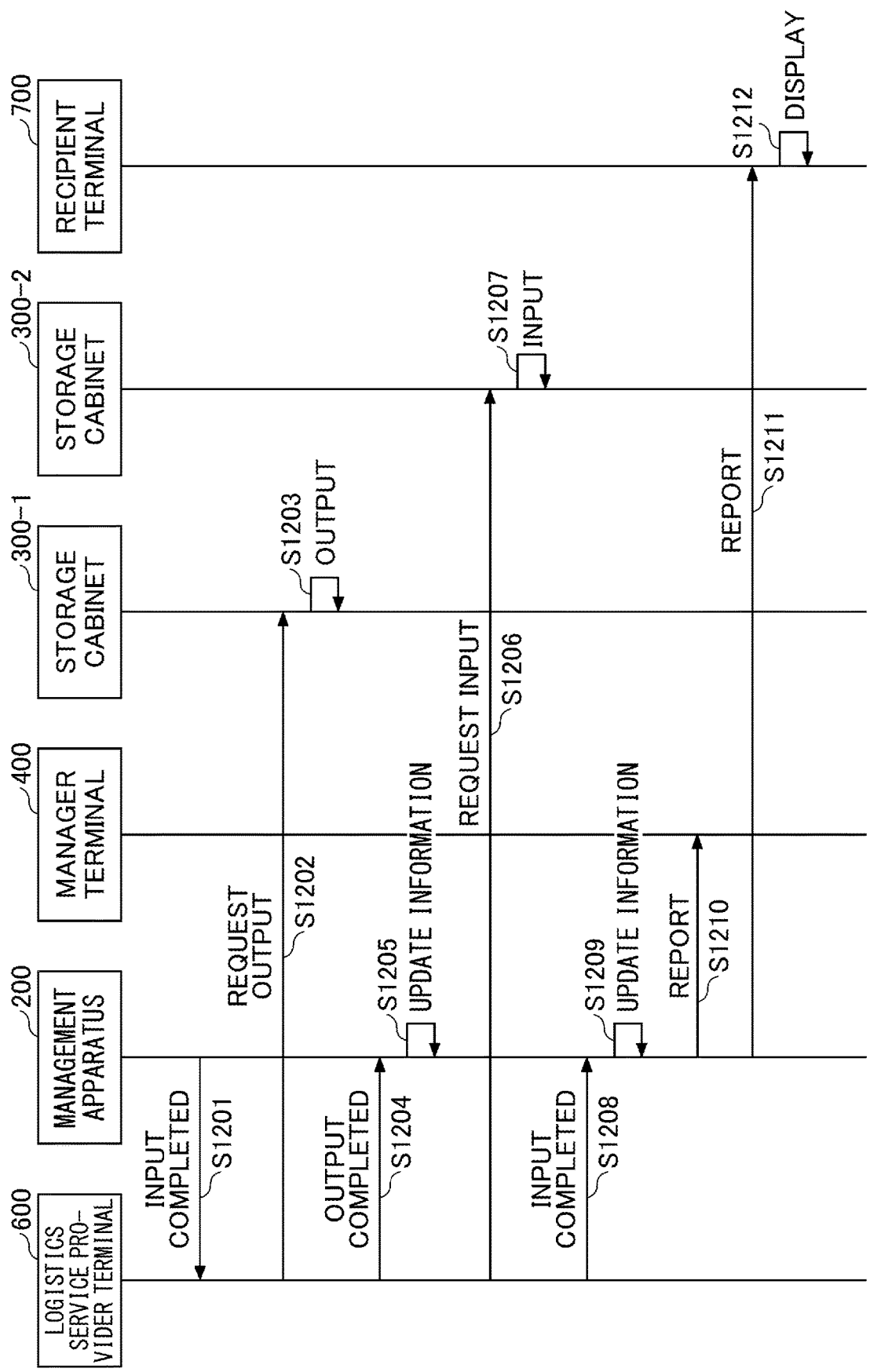
FIG. 12 is a third sequence diagram illustrating the operation of the management system.

FIG. 12 is a third sequence diagram explaining the operation of the management system. FIG. 12 illustrates a case where the storage cabinet 300 of the shipping source is the storage cabinet 300-1, and the storage cabinet 300 of the delivery destination (receiving side) is specified as the storage cabinet 300-2.

In the management system 100, the management apparatus 200 transmits an input completion report to the logistics service provider terminal 600 indicating that the input of the package to the storage cabinet 300-1 of the shipping source has been completed (step S1201). At this time, the input completion report may include a two-dimensional code including the package information.

Further, the management apparatus 200 may identify a logistics service provider having a transport vehicle mounted with a storage cabinet having vacant space corresponding to the size of the package and the number of packages indicated by the package information, and transmit the input completion report to the logistics service provider terminal 600 of the identified logistics service provider. In this case, the management apparatus 200 may hold information including the type of transport vehicle possessed by each logistics service provider and the usage status of the transport vehicle.

Upon receiving the input completion report, the logistics service provider terminal 600 requests the storage cabinet 300-1 to output the package (step S1202). Specifically, the logistics service provider causes the logistics service provider terminal 600 to display the two-dimensional code included in the input completion report, and causes the storage cabinet 300-1 to read the two-dimensional code.

The storage cabinet 300-1 identifies the package to be output based on the package information included in the two-dimensional code read from the logistics service provider terminal 600 by the input/output control unit 320, and outputs the specified package (step S1203).

The logistics service provider terminal 600 transmits an output completion report indicating that the logistics service provider has received the package, to the management apparatus 200, according to the operation of the logistics service provider (step S1204).

The delivery completion report may include, for example, information indicating the logistics service provider transporting the package and the transport vehicle of the logistics service provider, etc.

Subsequently, the management apparatus 200 updates the storage cabinet information of the storage cabinet 300-1 in the storage cabinet information database 210 (step S1205). Specifically, the vacant space in the storage cabinet information of the storage cabinet 300-1 is updated.

Next, the logistics service provider transports the package output from the storage cabinet 300-1 to the storage cabinet 300-2 of the delivery destination (receiving side), and the logistics service provider terminal 600 requests the storage cabinet 300-2 to input the package (step S1206). At this time, the logistics service provider terminal 600 displays a two-dimensional code to the storage cabinet 300-2 and causes the storage cabinet 300-2 to read the package information in the same manner as in step S1202.

The storage cabinet 300-2 identifies the reserved shelf based on the package information by the input/output control unit 320, and inputs the package according to the operation of the logistics service provider (step S1207).

When the input of the package is completed, the logistics service provider terminal 600 transmits the input completion report to the management apparatus 200 in accordance with the operation of the logistics service provider (step S1208).

The management apparatus 200 receives the input completion report and updates the storage cabinet information database 210 by the managing unit 240 (step S1209). Specifically, the managing unit 240 updates the vacant space in storage cabinet information of the storage cabinet 300-2 in the storage cabinet information database 210.

Subsequently, the management apparatus 200 transmits, to the recipient terminal 700 and the manager terminal 400, a report indicating that the package addressed to the recipient has been input to the storage cabinet 300-2, to the storage cabinet 300-2 (step S1210, 1211).

The report may include information indicating the storage cabinet 300-2, the sender of the package, the logistics service provider who transported the package, information relating to the transport vehicle, etc. Upon receiving the report, the recipient terminal 700 displays the report (step S1212).

The above is the operation of the management system 100 when transporting the package by the logistics service provider. Next, with reference to FIG. 13, the operation of the management system 100 in the case where the package input to the storage cabinet 300 of the delivery destination is received by the recipient will be described.

Figure 13:
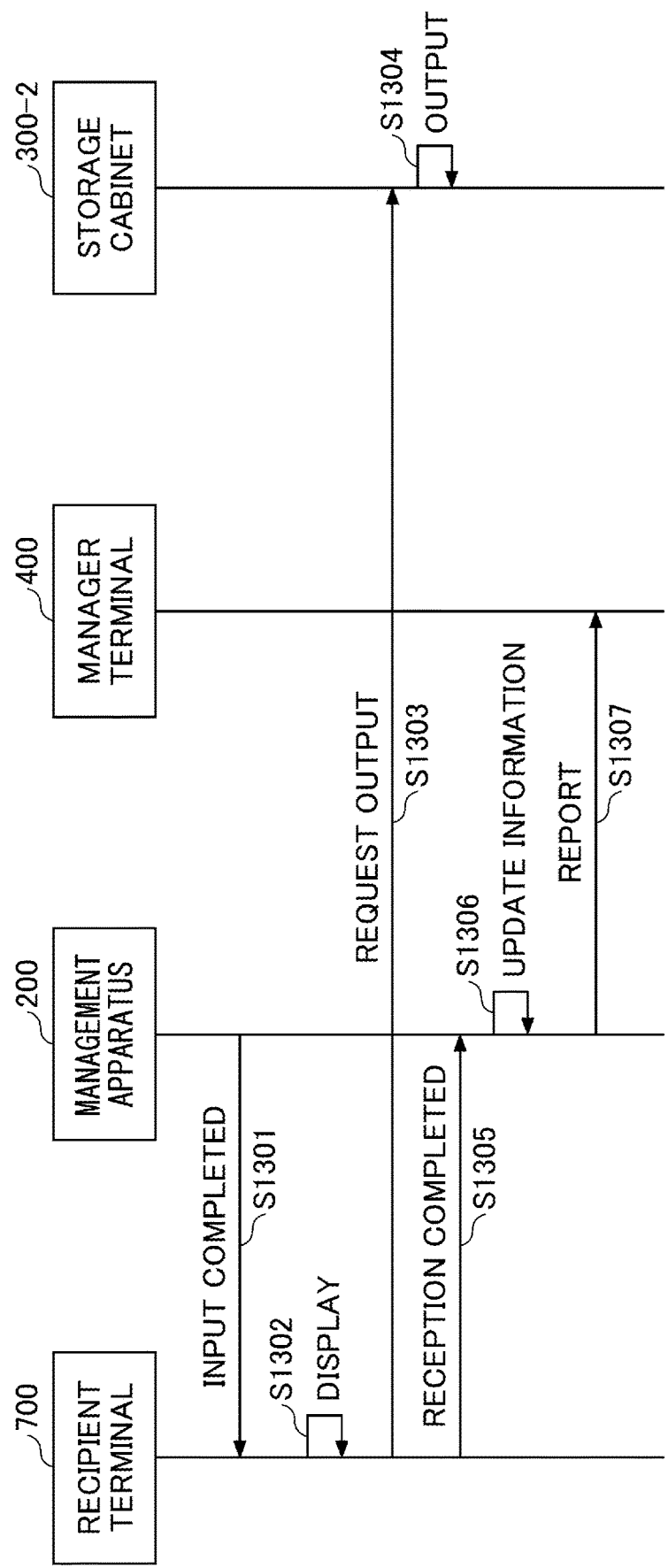
FIG. 13 is a fourth sequence diagram illustrating the operation of the management system.

FIG. 13 is a fourth sequence diagram explaining the operation of the management system. FIG. 13 illustrates a case where the storage cabinet 300 of the delivery destination (receiving side) is the storage cabinet 300-2.

In the management system 100, when the recipient terminal 700 receives the input completion report of the package from the management apparatus 200 to the storage cabinet 300-2 (step S1301), the recipient terminal 700 displays the report (step S1302). The input completion report may include a two-dimensional code in which the package information is embedded.

After receiving the input completion report, the recipient moves to the installation location of the storage cabinet 300-2, and makes an output request to the storage cabinet 300-2 by the recipient terminal 700 (step S1303). Specifically, the recipient terminal 700 causes the storage cabinet 300-2 to read the two-dimensional code included in the input completion report.

In response to receiving the input request, the storage cabinet 300-2 identifies the package to be output based on the package information included in the read two-dimensional code by the input/output control unit 320, and outputs the identified package (step S1304).

The recipient terminal 700 transmits the output completion report to the management apparatus 200 according to the operation of the recipient who has received the output package (step S1305).

The management apparatus 200 updates the storage cabinet information database 210 by the managing unit 240 (step S1306). Specifically, the managing unit 240 updates the vacant space in storage cabinet information of the storage cabinet 300-2 in the storage cabinet information database 210. Subsequently, the management apparatus 200 transmits a report indicating that the transportation of the package has been completed to the manager terminal 400 (step S1307). The above is the operation of the management system 100.

Next, a display example of the present embodiment will be described with reference to FIGS. 14 to 17. FIG. 14 is a first diagram illustrating a display example.

A screen 141 illustrated in FIG. 14 illustrates an example of a package information input screen displayed on the sender terminal 500. The screen 141 is displayed on the sender terminal 500, for example, in step S1001 of FIG. 10. Specifically, the screen 141 may be displayed on the sender terminal 500 by the management apparatus 200 when the sender terminal 500 requests the management apparatus 200 to input package information.

The screen 141 includes an input field 142 and an operation button 144, and the input field 142 includes input fields for inputting the purpose of use of the storage cabinet 300, the storage temperature of the package (cargo), and the size, input fields for inputting the name, address, telephone number, etc., of the sender, and input fields for inputting the desired sending date and time and the shipping source location, the name and the address of the recipient, the desired reception date and time, and the reception location.

In the example of FIG. 14, the purpose of use of the storage cabinet 300 is home delivery, the storage temperature of the package is frozen, and the size is M.

In the present embodiment, as the desired sending date and time and the desired reception date and time, initial values or the like may be input in advance, based on the date and time when the screen 141 is displayed on the sender terminal 500, etc. In the present embodiment, the shipping source location and the reception location can be selected from the map.

Specifically, for example, when any of links 143*a* and 143*b* displayed in the input fields of the shipping source location and the reception location is selected in the screen 141, a map may be displayed on the screen 141.

When an operation button 144 is operated after the input to the input field 142 is completed, the screen 141 transitions to the display screen of the vacancy status.

That is, the operation button 144 is an operation button for transmitting the package information input in the screen 141, to the management apparatus 200.

Figure 15:
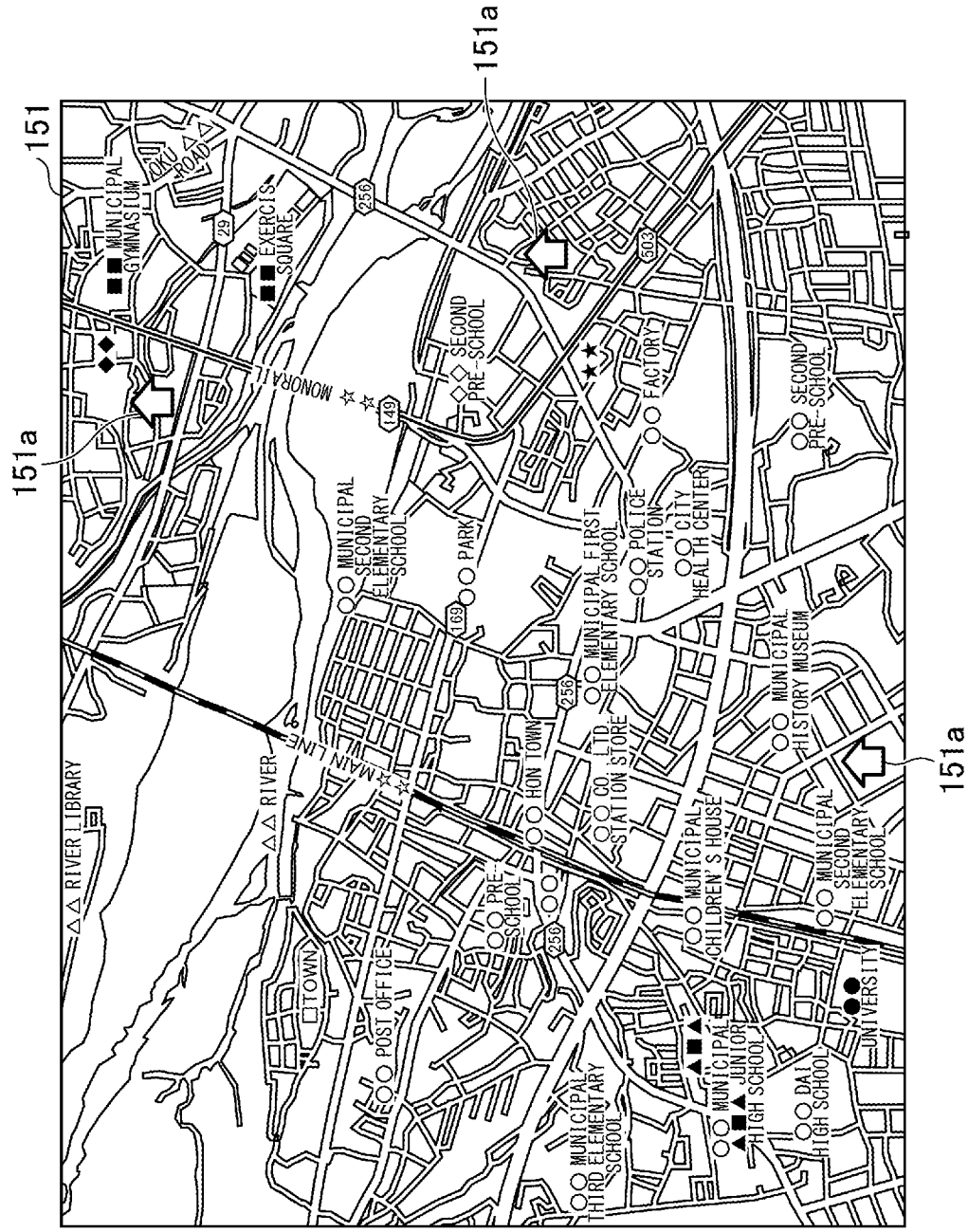
FIG. 15 illustrates an example of a map.

FIG. 15 is a diagram illustrating an example of a map. When the link 143*a* is selected in the screen 141, for example, the sender terminal 500 may display a map 151 of the area including the address of the sender on the screen 141.

On the map 151, an icon 151*a* indicating the installation location of the storage cabinet 300 is displayed. The icon 151*a* may be superimposed on the map 151 by, for example, the management apparatus 200 referring to the installation location in the storage cabinet information stored in the storage cabinet information database 210.

When the icon 151*a* is selected in the map 151, the sender terminal 500 sets the storage cabinet 300 corresponding to the selected icon 151*a* as the storage cabinet 300 of the shipping source.

When the link 143*b* is selected, the sender terminal 500 may display the map 151 of the area including the address of the recipient on the screen 141. When the icon 151*a* is selected on the map 151, the storage cabinet 300 corresponding to the selected icon 151*a* is set as the storage cabinet 300 of the delivery destination.

As described above, when the input to the input field 142 of the screen 141 is completed and the operation button 144 is operated, the screen 141 of the sender terminal 500 transitions to a screen on which information indicating the vacancy status of the storage cabinet 300 is displayed.

FIG. 16 is a second diagram illustrating a display example. A screen 161 illustrated in FIG. 16 is an example of a screen displayed on the sender terminal 500 in step S1006 of FIG. 10. Specifically, the screen 161 illustrated in FIG. 16 is an example of a screen on which information indicating vacancy status transmitted from the management apparatus 200 is displayed.

The screen 161 includes display columns 162 and 163. In the display column 162, a candidate for the storage cabinet 300 of the shipping source, an address indicating the installation location, and a time period during which usage is possible are displayed. Further, in the display column 162, a candidate for the storage cabinet 300 of the delivery destination, an address indicating the installation location, and a time period during which usage is possible are displayed.

All of the storage cabinets 300 displayed here are storage cabinets in which the storage condition is freezing and there is a vacancy on a shelf for storing an M-size package.

Thus, in the present embodiment, information indicating a storage cabinet having a use corresponding to the storage temperature (environment setting) of package, and having vacant space corresponding to the size of package and the number of packages, is output to the sender terminal 500 as information indicating the vacancy status.

Further, in the present embodiment, information indicating the storage cabinet installed closest to the shipping source location (address of the sender) of the package and information indicating the time period when the storage cabinet can be used, are output to the sender terminal 500 as information indicating the vacancy status.

In the present embodiment, the storage cabinet 300 can be reserved by selecting the storage cabinet 300 of the shipping source and the storage cabinet 300 of the delivery destination from the candidates of the storage cabinets 300 displayed in the display columns 162 and 163, and specifying the use time of each storage cabinet 300.

Further, in the present embodiment, according to the function of the storage cabinet 300, when the use time of the storage cabinet 300 input at the time of inputting the package information is exceeded, an additional fee may be charged.

In the example of FIG. 16, it can be seen that, when packages are stored in all of the storage cabinets 300 identified as a shipping source candidate and the storage cabinets 300 identified as a delivery destination candidate even when the pre-reserved use time is exceeded, an additional fee is charged for the transportation charge.

In the above-described embodiment, the storage cabinet 300 is used for transporting a package for home delivery, etc., but the present embodiment is not limited thereto.

The storage cabinet 300 may be used, for example, as a locker for the user to temporarily store his/her own package. The storage cabinet 300 may also be used for the user to store his/her package on a long-term basis.

FIG. 17 is a third diagram illustrating a display example. A screen 141A illustrated in FIG. 17 is an example of a package information input screen when the storage cabinet 300 is used as a locker.

The screen 141A includes an input field 142A and an operation button 144. In the input field 142A, "locker" is selected as the purpose of use of the storage cabinet 300. Further, in the input field 142A, a link 143c for displaying a map is displayed, and when the link 143c is selected, a map including an icon indicating the installation location of the storage cabinet 300 is displayed.

FIG. 18 is a fourth diagram illustrating a display example. A screen 141B illustrated in FIG. 18 is an example of a package information input screen when the storage cabinet 300 is used for long-term storage of packages.

The screen 141B includes an input field 142B and an operation button 144. In the input field 142B, items such as temperature setting and ventilation requirement necessary for long-term storage of a package are included.

In the present embodiment, the environment in the storage cabinet 300 can be set according to the purpose of use of the storage cabinet 300. Further, in the present embodiment, the vacancy status of the storage cabinet suitable for storing a package is presented.

Further, in the present embodiment, the installation location and use of the storage cabinet 300 can be changed. Therefore, in the present embodiment, the storage cabinet 300 that satisfies the condition indicated by the package information input by the user can always be provided to the user.

Although the embodiments have been described above, it will be understood that various changes in form and details can be made without departing from the object and scope of the claims.

The present international application is based upon and claims priority to Japanese Patent Application No. 2021-059429 filed on Mar. 31, 2021, the entire contents of which are incorporated herein by reference.

REFERENCE SIGNS LIST 100 management system
200 management apparatus
210 storage cabinet information database
220 package information database
230 acquiring unit
240 managing unit
250 output unit
260 storage cabinet managing unit
300 storage cabinet
310 information acquiring unit
320 input/output control unit
330 environment control unit
340 communication control unit
400 manager terminal
500 sender terminal
600 logistics service provider terminal
700 recipient terminal

The invention claimed is:

1. A management apparatus for managing a status of a plurality of storage cabinets whose use application can be changed, the management apparatus comprising:
    circuitry configured to
        collect storage cabinet information including the use application of the plurality of storage cabinets and information relating to a usage status of the plurality of storage cabinets;
        acquire information relating to a package to be stored;
        change the use application of a first storage cabinet among the plurality of storage cabinets; and
        output information indicating a vacancy status of the first storage cabinet corresponding to a use application of the package, based on the information relating to the package and the storage cabinet information,
    wherein the use application of the plurality of storage cabinets includes (i) a first temperature condition in which a frozen state is maintained, (ii) a second temperature condition in which a chilled state is maintained, and (iii) a third temperature condition different from the first temperature condition and the second temperature condition, and
    wherein the circuitry is configured to
        receive an indication to change a set temperature condition of the first storage cabinet, before changing the use application of the first storage cabinet;
        identify, based on the indication, a particular temperature condition among the first temperature condition, the second temperature condition, and the third temperature condition; and
        change the set temperature condition of the first storage cabinet to the particular temperature condition that is different from the set temperature condition.

2. The management apparatus according to claim 1, wherein the storage cabinet information includes position information indicating an installation location of each of the plurality of storage cabinets, and
    wherein the circuitry is configured to change the use application of the first storage cabinet based on the information relating to the package and the position information.

3. The management apparatus according to claim 1, wherein the circuitry is configured to change the use application of the first storage cabinet, upon occurrence of a condition in which there is no storage cabinet suitable for the use application of the package.

4. The management apparatus according to claim 1, wherein the indication includes an environment target value for the first storage cabinet including a refrigeration control unit or a freezing control unit.

5. The management apparatus according to claim 1, wherein a location where the first storage cabinet is installed can be changed.

6. The management apparatus according to claim 1, wherein the information relating to the package includes a size of the package, a number of packages, and an environment setting corresponding to the package, and
    wherein the circuitry is configured to output, as the information indicating the vacancy status, information indicating the first storage cabinet that has a changed use application corresponding to the environment setting of the package and that has a vacant space corresponding to the size of the package and the number of packages.

7. The management apparatus according to claim 1, wherein the information relating to the package includes a shipping source location of the package, a scheduled delivery date of the package, and an environment setting corresponding to the package, and
    wherein the circuitry is configured to output, as the information indicating the vacancy status, (i) information indicating the first storage cabinet that has a changed use application corresponding to the environment setting of the package and that is installed closest to the shipping source location of the package and (ii) information indicating a time period during which the first storage cabinet is to be used.

8. The management apparatus according to claim 1, wherein the information relating to the package includes a size of the package, a number of packages, a shipping source location of the package, a scheduled delivery date of the package, and an environment setting corresponding to the package, and wherein the circuitry is configured to output, as the information indicating the vacancy status, (i) vehicle information indicating a vehicle mounted with the first storage cabinet that has a changed use application corresponding to the environment setting of the package and that has a vacant space corresponding to the size of the package and the number of packages, and (ii) information indicating an arrival date and time when the vehicle arrives at the shipping source location for the package.

9. The management apparatus according to claim 1, wherein the circuitry is configured to acquire, from an external device, the information relating to the package to be stored input to the external device by a user, and output, to the external device, the information indicating the vacancy status of the first storage cabinet corresponding to the use application of the package input by the user.

10. The management apparatus according to claim 9, wherein the circuitry is configured to update the information relating to the usage status of the first storage cabinet that is selected, when the first storage cabinet is selected at the external device.

11. A management system comprising:

a plurality of storage cabinets whose use application can be changed; and a management apparatus including circuitry configured to manage a status of the plurality of storage cabinets, wherein the circuitry of the management apparatus is configured to collect storage cabinet information including the use application of the plurality of storage cabinets and information relating to a usage status of the plurality of storage cabinets;

acquire information relating to a package to be stored;

change the use application of a first storage cabinet among the plurality of storage cabinets; and output information indicating a vacancy status of the first storage cabinet corresponding to a use application of the package, based on the information relating to the package and the storage cabinet information, wherein the use application of the plurality of storage cabinets includes (i) a first temperature condition in which a frozen state is maintained, (ii) a second temperature condition in which a chilled state is maintained, and (iii) a third temperature condition different from the first temperature condition and the second temperature condition, and wherein the circuitry is configured to receive an indication to change a set temperature condition of the first storage cabinet, before changing the use application of the first storage cabinet;

identify, based on the indication, a particular temperature condition among the first temperature condition, the second temperature condition, and the third temperature condition; and change the set temperature condition of the first storage cabinet to the particular temperature condition that is different from the set temperature condition.

12. A management method of a storage cabinet performed by a management apparatus for managing a status of a plurality of storage cabinets whose use application can be changed, the management method comprising:

collecting storage cabinet information including the use application of the plurality of storage cabinets and information relating to a usage status of the plurality of storage cabinets;

acquiring information relating to a package to be stored;

changing the use application of a first storage cabinet among the plurality of storage cabinets; and outputting information indicating a vacancy status of the first storage cabinet corresponding to a use application of the package, based on the information relating to the package and the storage cabinet information, wherein the use application of the plurality of storage cabinets includes (i) a first temperature condition in which a frozen state is maintained, (ii) a second temperature condition in which a chilled state is maintained, and (iii) a third temperature condition different from the first temperature condition and the second temperature condition, and wherein the management method further includes receiving an indication to change a set temperature condition of the first storage cabinet, before changing the use application of the first storage cabinet;

identifying, based on the indication, a particular temperature condition among the first temperature condition, the second temperature condition, and the third temperature condition; and changing the set temperature condition of the first storage cabinet to the particular temperature condition that is different from the set temperature condition.

13. A non-transitory computer-readable recording medium storing a management program that causes a management apparatus to execute a method, the management apparatus managing a status of a plurality of storage cabinets whose use application can be changed, the method comprising:

collecting storage cabinet information including the use application of the plurality of storage cabinets and information relating to a usage status of the plurality of storage cabinets;

acquiring information relating to a package to be stored;

changing the use application of a first storage cabinet among the plurality of storage cabinets; and outputting information indicating a vacancy status of the first storage cabinet corresponding to a use application of the package, based on the information relating to the package and the storage cabinet information, wherein the use application of the plurality of storage cabinets includes (i) a first temperature condition in which a frozen state is maintained, (ii) a second temperature condition in which a chilled state is maintained, and (iii) a third temperature condition different from the first temperature condition and the second temperature condition, and wherein the method further includes receiving an indication to change a set temperature condition of the first storage cabinet, before changing the use application of the first storage cabinet;

identifying, based on the indication, a particular temperature condition among the first temperature condition, the second temperature condition, and the third temperature condition; and changing the set temperature condition of the first storage cabinet to the particular temperature condition that is different from the set temperature condition.

* * * * *